UNITED STATES PATENT OFFICE.

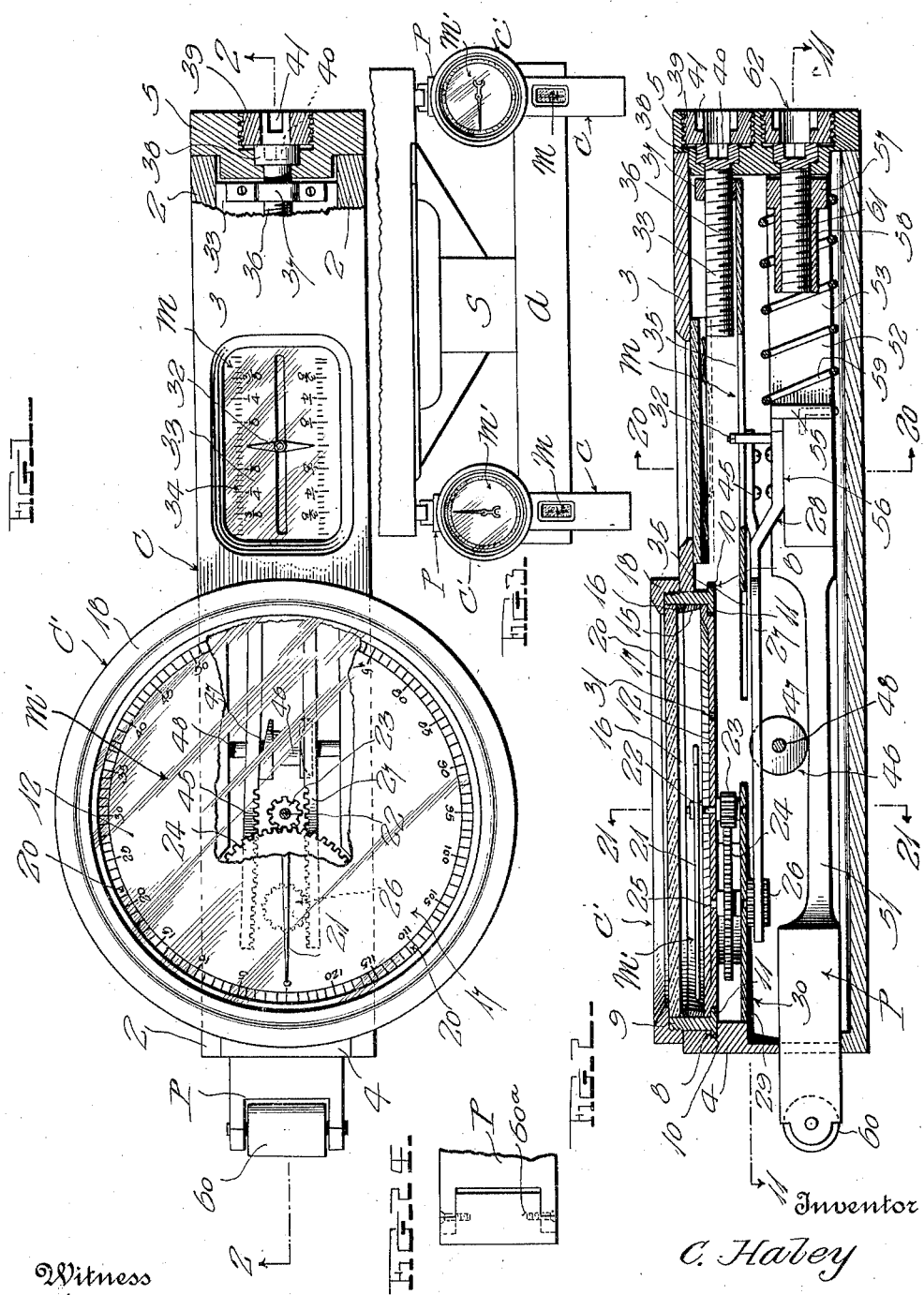

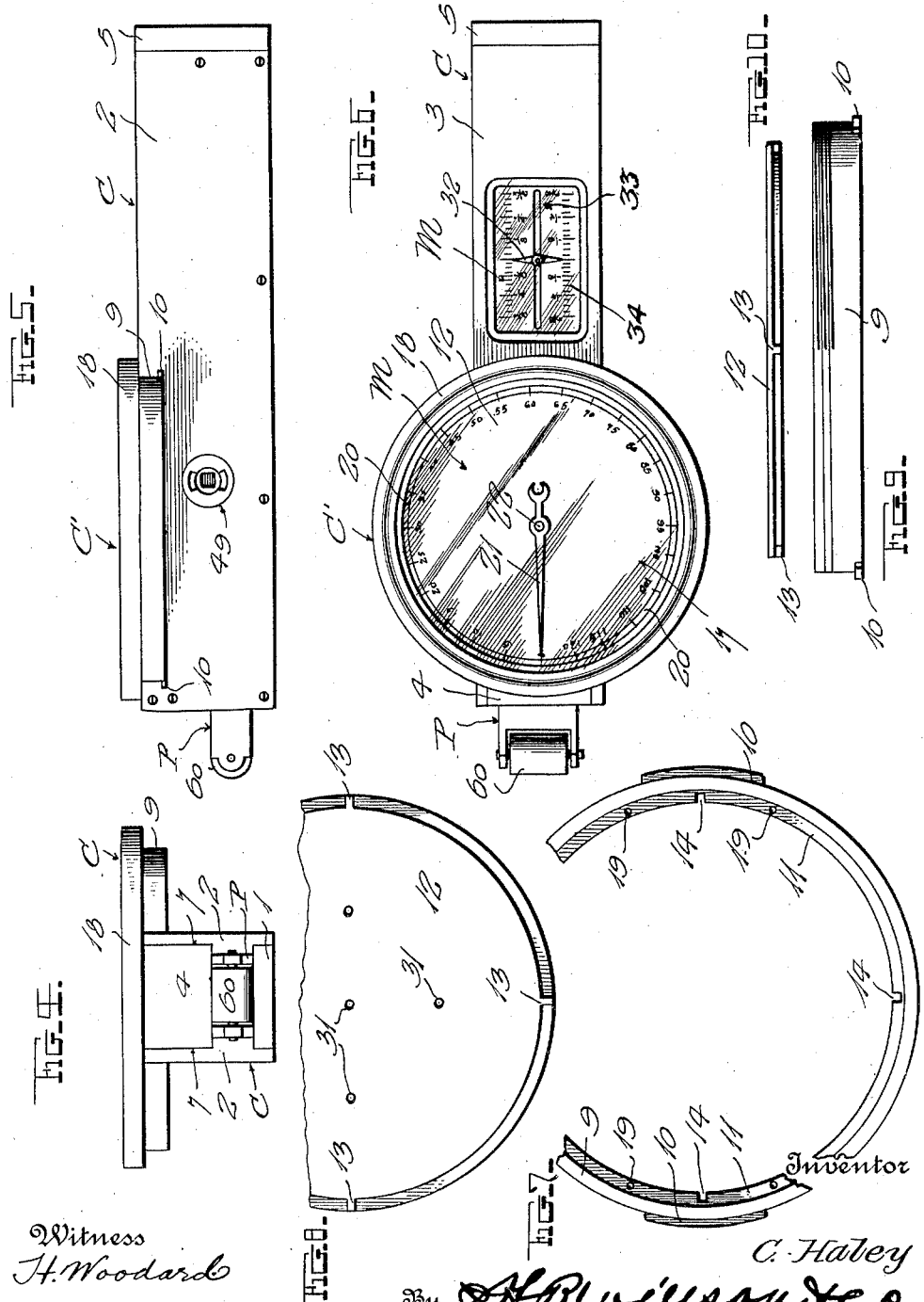

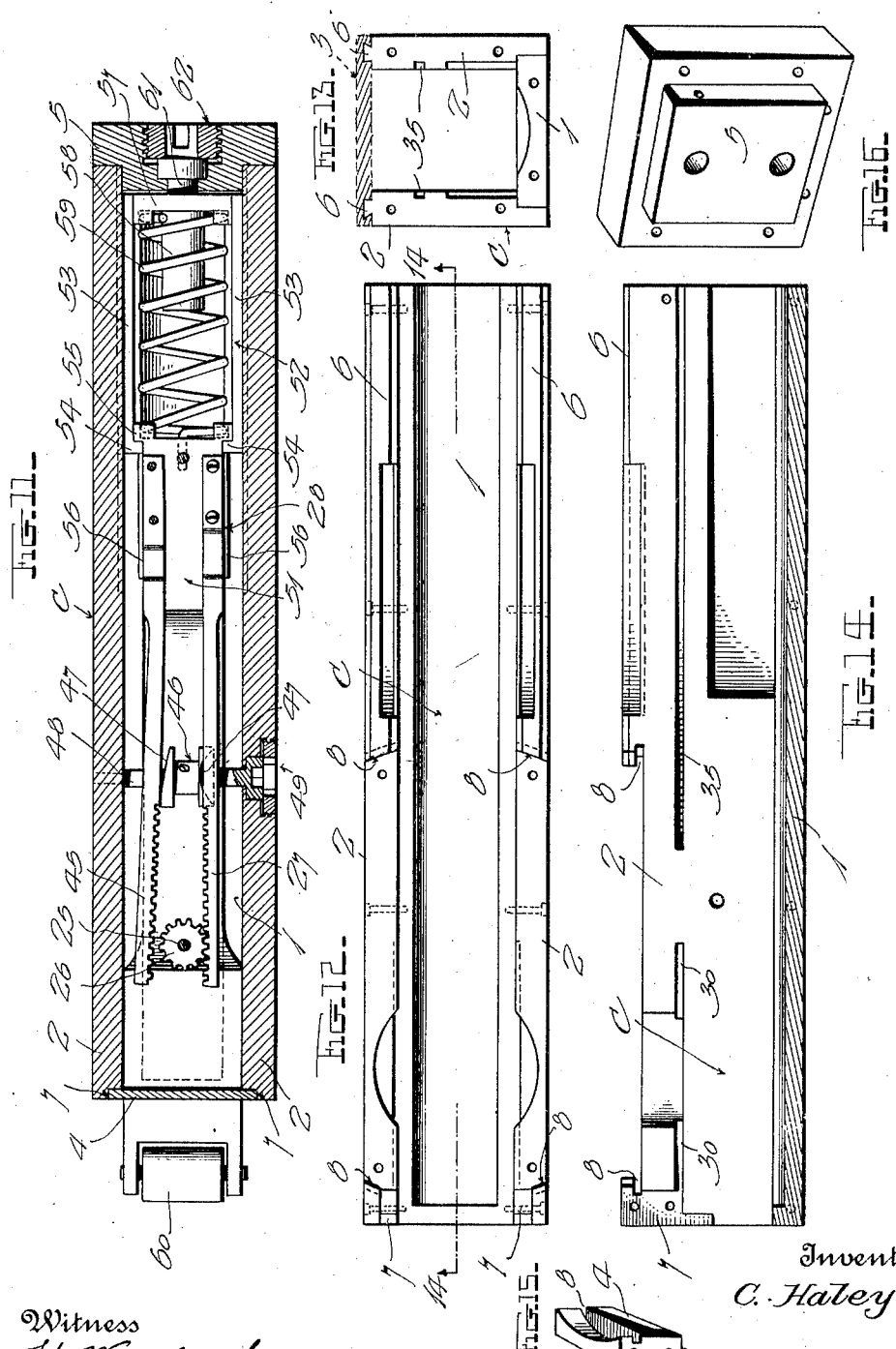

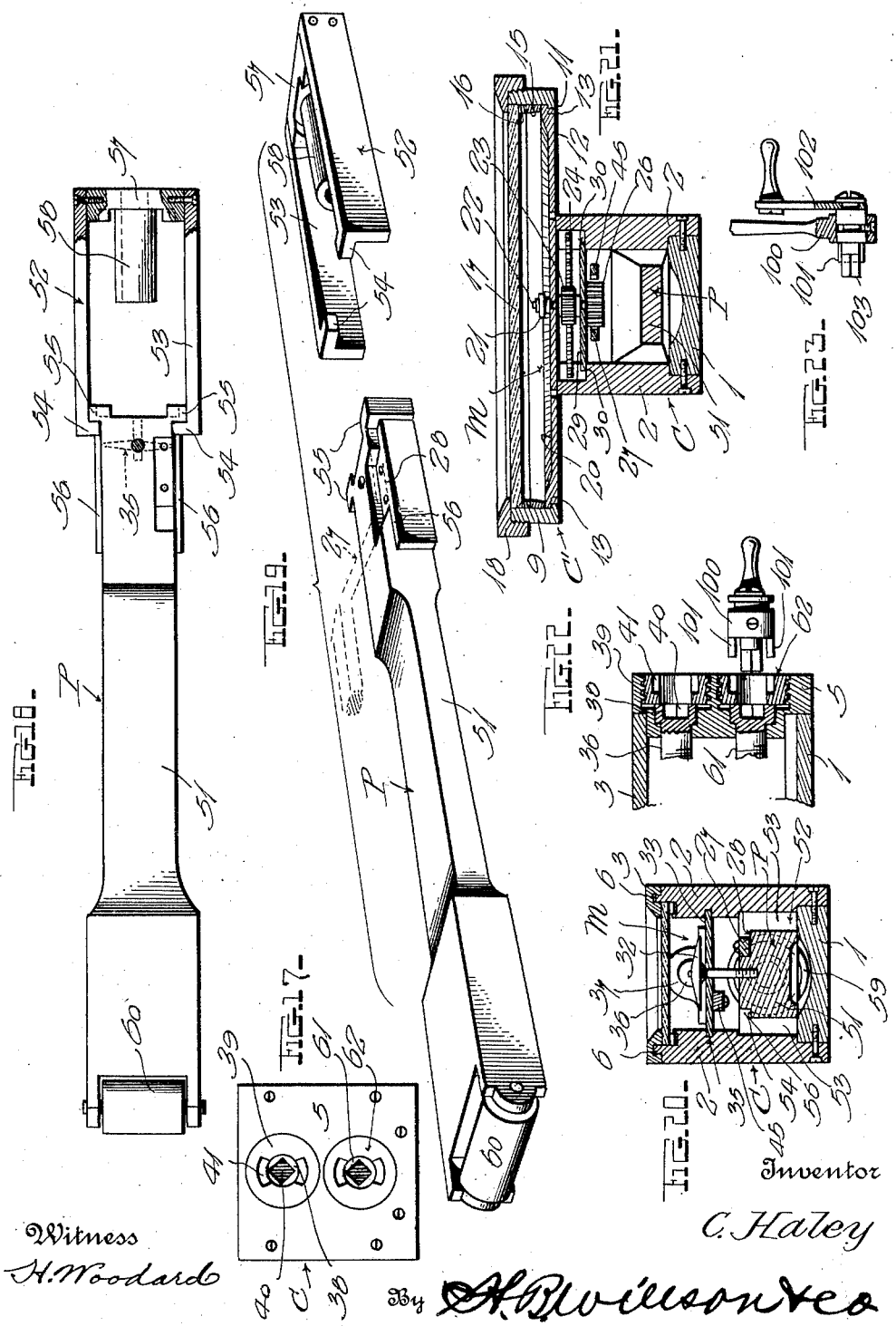

CHARLES HALEY, OF ROYAL OAK, MICHIGAN.

MACHINIST'S GAGE.

1,334,999.  Specification of Letters Patent.  Patented Mar. 30, 1920.

Application filed June 7, 1918. Serial No. 238,675.

*To all whom it may concern:*

Be it known that I, CHARLES HALEY, a citizen of the United States, residing at Royal Oak, in the county of Oakland and State of Michigan, have invented certain new and useful Improvements in Machinists' Gages; and I do declare the following to be a full, clear, and exact description of the invention, such as will enable others skilled in the art to which it appertains to make and use the same.

My invention relates to gages and more particularly for use in connection with numerous metal working machines, such as lathes, planers, shapers, etc., for indicating when the required amount of material has been removed.

One object of the invention is to provide a gage which will constantly indicate to the machinist the progress of the work, from the beginning of the cut to the end thereof, thus eliminating all danger of overcuts and undercuts.

A further object is to provide a gage having two sets of indicating means, one being provided with comparatively large units of measurement, such as eighths of an inch, for roughly indicating the progress of the work, and the other graduated for instance in thousandths of an inch, for accurate indication.

Still further objects are to provide means whereby the work engaging shoe may be advanced beyond its usual position where making exceptionally deep cuts, and to provide for restoring the two indicators to zero position after such adjustment of the shoe.

In connection with re-setting of the indicators, after adjustment of the shoe, an additional object is to provide for the disengagement of the operating means of one of said indicators, and the simultaneous application of its normally idle re-setting means.

Yet another object is to so construct the work engaging plunger as to cause constant forward stress thereon by spring pressure regardless of the extent to which said plunger has been adjusted, whereby to maintain the end of said plunger tightly against the work at all times.

With the foregoing objects in view, the invention resides in the novel features of construction and unique combinations of parts to be hereinafter fully described and claimed, the descriptive matter being supplemented by the accompanying drawings which form a part of this application and in which:

Figure 1 is a top plan view of the improved gage with parts broken away and in horizontal section;

Fig. 2 is a longitudinal section on the plane of the line 2—2 of Fig. 1;

Fig. 3 is a small plan view showing the manner in which two of the indicators may be supported when working upon a transmission casing or the like;

Fig. 4 is a front end view;

Fig. 5 is a side elevation;

Fig. 6 is a top plan view;

Fig. 7 is an upper edge view of the ring carrying the dial of one of the indicators;

Fig. 8 is a bottom plan view of the dial;

Figs. 9 and 10 are edge views of the parts seen in Figs. 7 and 8 respectively;

Fig. 11 is a horizontal section on the planes indicated by the line 11—11 of Fig. 2;

Fig. 12 is a top plan view of the hollow body member or casing with its top and ends removed;

Fig. 13 is a rear end elevation of the parts shown in Fig. 12;

Fig. 14 is a longitudinal section on the plane of the line 14—14 of Fig. 12;

Fig. 15 is a perspective view of the front end of the casing;

Fig. 16 is a similar view of the rear end thereof;

Fig. 17 is a rear end elevation of the complete tool;

Fig. 18 is a top plan view of the work engaging plunger;

Fig. 19 is a perspective view of the plunger showing the front and rear sections thereof in juxtaposition;

Figs. 20 and 21 are vertical transverse sections on the planes indicated by the lines 20—20 and 21—21 respectively of Fig. 2;

Fig. 22 is a detail longitudinal section showing the manner in which a special tool may be used for releasing the lock nuts of the several adjusting devices and then adjusting said devices;

Fig. 23 is a sectional view of the tool; and

Fig. 24 is a detail plan view showing a different form of shoe which may be used on the plunger.

Briefly speaking, the improved gage consists of a supporting body in the form of a casing C, a plunger P slidable in and extending from said casing to engage the work, indicating means M to roughly show the progress of the work, additional indicating means M' for accurate indication, preferably in thousandths of an inch, means whereby the plunger P may be advanced beyond its normal position when making exceptionally deep cuts, and means whereby the two indicating means M—M' may be restored to zero position after the adjustment of said plunger, this being necessary in view of the fact that any movement of the plunger will operate the indicating mechanisms.

The casing C is preferably of sectional construction, consisting of a bottom 1, sides 2, top 3, front end 4, and rear end 5, all secured together by screws or the like, the top 3 however being preferably dove-tailed in place as seen at 6 in Figs. 12, 13 and 14. The sides 2 of the casing are preferably provided with seats 7 receiving the ends of the end member 4 as shown in Figs. 4, 12 and 14, and it will be observed that said end member terminates above the bottom 1 to permit the plunger P to slide beneath the same. A casing C' is provided at the front end of the casing C, for the indicating means M', and the sides 2 of said casing C, as well as the inner side of the end 4, are undercut as seen at 8 to retain said casing C' in place.

The casing C' is preferably of the construction seen most clearly by reference to Figs. 2, 7, 8, 9 and 10, said casing including a ring 9 detailed in Figs. 7 and 10, said ring having ribs 10 received in the under cuts 8, whereby said ring is retained in place. On its inner side, the ring 9 is provided with an annular ledge 11 which supports the dial plate 12 detailed in Figs. 8 and 10, said dial plate having depending lugs 13 receivable in notches 14 formed in the ledge 11, whereby to hold the dial plate normally against rotation, but to permit it to be adjusted should this be necessary for any reason. To retain the plate 12 in place, a ring 15 rests thereon and is provided on its upper edge with a gasket 16 upon which a glass lens or the like 17 rests, said lens being secured in place by a retaining ring 18 which is threaded on the upper edge of ring 9. To prevent bodily rotation of the casing C' in respect to casing C, any suitable provision may be made, such as the passage of screws into said casing C through the openings 19 formed in the ledge 11 (see Fig. 7).

The peripheral portion of the plate 12 is provided with an indicating scale 20 preferably graduated in thousandths of an inch, and an indicating hand 21 coacts with this scale to accurately show the movement of the plunger P. Hand 21 is carried on the upper end of a shaft 22 having on its lower end a pinion 23 which meshes with a gear 24, said gear being mounted fixedly on a short vertical shaft 25 whose lower end is provided with a pinion 26. A rack bar 27 normally meshes with the pinion 26, one end of said bar being secured to the plunger P in a recess 28 formed therein. It will thus be clear that as the plunger moves forwardly or rearwardly, the train of gears will be operated to move the indicating finger 21 over the scale 20, whereby the exact movement of said plunger may be determined. The gear 24 and the pinion 23 preferably rest on a horizontal supporting plate 29 whose edges are received in grooves 30, (Figs. 14 and 21), said grooves being formed in the sides 2 of the casing C. The shafts 22 and 25 pass through the plate 29 and also through the dial plate 12, the latter being provided with openings 31, any one of which may receive the upper end of shaft 25, according to the position to which the dial plate may be set as above suggested.

The indicating means M consist of a pointer 32 movable bodily with the plunger P, and a scale 33 having graduations 34 coacting with said pointer, said graduations preferably indicating eighths of an inch. As above set forth, means are provided for adjusting the plunger forwardly from its usual position, when an unusually deep cut is to be made, and in order that the pointer 32 and scale 33 may be restored to zero position after such adjustment, said scale is slidably mounted in the casing, preferably having its edges positioned in grooves 35 formed in the sides 2. If the plunger P is advanced say a quarter of an inch, the pointer 32 will indicate this amount of movement on the scale 33, and it is then necessary to advance this scale the same amount to position said pointer at the zero point. To so adjust the scale, any preferred means could well be employed, but by preference I swivel a screw 36 in the rear end 5 of the casing C, and thread said screw through a nut 37 on the rear end of the scale 33. The screw 36 is preferably swiveled by providing its rear end with a circular head 38 as detailed in Figs. 2 and 22, said head being retained in an appropriate socket by a lock nut or plug 39. Head 38 is provided with a socket 40 and plug 39 with a pair of sockets 41 to receive parts of an adjusting tool yet to be described, whereby the lock nut may be loosened, the screw 36 adjusted, and said nut again tightened, so that the screw will be held against accidental movement.

Since advancing of the plunger P as above set forth, also advances the indicating hand 21 along the scale 20, it is necessary to provide means whereby said hand may be restored to its original non-indicating position, and since it is highly desirable that only one adjustment shall be necessary to return both indicating mechanisms M and M', I have made provision whereby the latter may be re-set by the movement imparted to the scale 33 by the screw 36. In obtaining this result, the re-setting rack bar 45 is secured to the scale 33, and provision is made whereby this rack bar is normally held out of mesh with pinion 26, such provision however serving to simultaneously engage the rack bar 45 with the pinion and disengage the rack bar 27 therefrom. By this arrangement, it will be obvious that adjustment of the scale 33 so as to restore the means M to non-indicating position, will cause the rack bar 45 to so operate pinion 26 as to similarly restore the indicating hand 21 to zero.

The means employed for controlling the two rack bars 27 and 45 may vary, but the following arrangement is preferably employed: A double acting cam member 46 is provided with cam ends 47 engaging the inner opposed sides of the rack bars as will be clear from Figs. 1, 2 and 11, these cams being so arranged as to simultaneously disengage one rack bar from the pinion 26 and engage the other therewith, by simply rotating the member 46. To so rotate the member in question, it is mounted fixedly on a transverse rock shaft 48, and by suitable means 49, preferably identical with the parts 38 and 39 above described, this shaft may be turned when necessary and locked against further rotation (see Fig. 11). The two rack bars may either be fixed and sufficiently resilient to permit movement thereof away from the pinion 26, or they could be otherwise mounted, as will be readily understood. In the present showing, the rack bars are constructed of resilient material and the cams 47 merely spring them away from the pinion.

The specific construction and the adjusting means of the plunger P may of course vary, but as shown in the present illustration, the following arrangement is employed: The plunger in question consists of a front male section 51 and a rear female section 52 sliding one within the other, said section 52 being preferably of U shape with its parallel arms 53 receiving the rear end of section 51 slidably therebetween (Figs. 11, 18 and 19), said arms having stops 54 on their ends coacting with other stops 55 on the section 51 to limit the forward movement of the latter. The stops 54 preferably ride on ledges 56, whereby they serve also to prevent upward movement of the rear end of section 51, said ledges being formed on said section as shown most clearly in Figs. 18 and 19. The transverse end bar 57 of the female section 52 is provided with a tubular nut 58 extending into said section, said nut being surrounded by the rear end of a coiled spring 59 which is located between the arms 53 and bear at its front end against section 51, whereby to exert a constant forward thrust on the latter to retain the roller or other shoe 60 at its front end, in contact with the work at all times. A screw 61 is swiveled on the rear end 5 of the casing C and is threaded into the nut 58, the outer end of said screw being provided with means 62 identical with the means 39 above described, whereby the same tool may be used for making any adjustment on the instrument. By releasing the lock nut of the means 62 and rotating the screw 51, the plunger P may be advanced to the required extent, whereupon said lock nut will be again tightened. It is this advancing of the plunger that renders necessary the re-setting of the indicating means M and M' to zero position as above set forth, but it may be here pointed out that the plunger is under normal conditions, adjusted rearwardly to its greatest extent, being only advanced beyond this position when the depth of cut to be made is greater than the distance which the plunger normally projects from the casing. This however can be better understood after entering in more detail into the operation of the instrument.

In use, the casing C is secured upon any suitable support and is moved forwardly until the shoe 60 contacts with the work. If five thousandths of an inch, for instance, are to be removed from the work, the casing is now forced still farther toward the work until the indicating hand 21 registers five-thousandths on the scale 20. This having been done, the cutting or grinding operation is performed, and it will be obvious that as the material is removed by the cutter, grinder, etc., the spring 59 will gradually advance the plunger P, maintaining the shoe 60 in contact with the work at all times. Thus, when the plunger has moved outwardly sufficiently to return the hand 21 to zero, the machinist is informed that five thousandths of an inch have been removed. The same operation is of course carried out in making cuts of any depth, except those which are exceptionally deep. When a comparatively large amount of material is to be removed, the indicating means M may be consulted to roughly show the progress of the work, but when the indicator 32 nears zero, much more accurate results can be obtained by then closely watching the pointer 21, continuing the cut until this pointer has returned to zero. The device will furnish a constant reading to the machinist so that at all times he may ascertain the exact progress of the work, thus eliminating all danger of removing too much or too little material.

When the depth of cut to be made is greater than the inward movement which the section 51 of plunger P is allowed, it is necessary to advance the plunger beyond its normal position, since otherwise the casing could not be advanced upon the plunger sufficiently to cause the two indicating mechanisms to register the depth of the cut to be made. It is under these conditions that the adjusting screw 61 is used, and since all movement of the plunger correspondingly moves the indicators 32 and 21 along the scales 34 and 20 respectively, it is necessary to re-set both mechanisms M and M' after the plunger has been advanced the required extent. In attaining this result, shaft 48 is turned to disengage the rack bar 27 from the pinion 26 and to simultaneously mesh the rack bar 45 with said pinion. This having been done the screw 36 is rotated until zero on the scale 33 is opposite the pointer 32. This movement also causes the rack bar 27 and pinion 26 to simultaneously return the hand 21 to zero on the scale 20. The adjustment having been made, the lock nut 39 is tightened, the cam 46 is returned to its original position, and the instrument is then in condition for use.

When performing certain special kinds of work, such as finishing the ends of transmission casings, the arrangement shown in Fig. 3 may be employed. In this figure, two of the improved gages are shown mounted on the opposite ends of a cross arm A having a suitable support S to be alined with the shaft bearing. This and similar arrangements may be used for numerous purposes which will be apparent to those skilled in the art.

The tool above referred to for making the several adjustments, (see Figs. 22 and 23) preferably consists of a wrench 100 having projections 101 for reception in the sockets such as 41, and a crank 102 swiveled in the head of the wrench 100 and provided with a plug 103 for engagement with the other sockets, 40 for instance.

From the foregoing, it will be seen that I have provided a gage which will possess a number of advantageous features, although being of comparatively simple nature. In addition to indicating the progress of the cut being made, any gyrating or wabbling movement of the work will be indicated by a fluctuation of the pointers 21 and 32, so that the difficulty may be immediately rectified. It is also possible that the gage could be used to verify work done on other machines, since by establishing some suitable fixed relation between the casing C and the work, contact of the shoe 60 with the latter, will position the indicators 21 and 32 at zero, provided the job has been accurately done. If not, any overcut or undercut will be accurately indicated.

In the foregoing, I have described certain specific details which are illustrative only of the many ways in which the gage may be constructed, and I wish it understood that the invention is not restricted to such specific features; also that the use of the device is not limited to any particular field, considerable latitude being allowed within the scope of the invention as claimed.

Also in some instances, the roller 60 may be dispensed with in favor of a smooth faced shoe 60' (Fig. 24), this shoe being used when very little or no friction between the instrument and work exists.

I claim:

1. A gage of the class described comprising a body, a work engaging shoe carried movably by said body, indicating means connected with said shoe for showing the movement thereof, means whereby said shoe may be advanced from said body prior to use, and means whereby said indicating means may be restored to zero position after advancement of said shoe.

2. A gage of the class described comprising a body, a work engaging plunger carried movably by said body, indicating means connected operatively with said plunger for showing roughly the movement thereof, additional indicating means operatively associated with said plunger for accurately showing its movement, means whereby said plunger may be advanced from said body prior to use, and means whereby said first and second named indicating means may be simultaneously restored to zero position after advancement of said plunger.

3. A gage of the class described comprising a body, a work engaging plunger carried movably by said body, an indicator connected operatively with said plunger, an indicating scale coacting with said indicator to roughly show the movement of said plunger, additional indicating means connected operatively with said plunger to accurately show the movement thereof, means whereby said plunger may be advanced from said body prior to use, means whereby said indicating scale may be restored to zero position after advancement of said plunger, and means operated by the movement of said scale for simultaneously restoring said additional indicating means to zero position.

4. A gage of the class described comprising a body, a work engaging plunger carried movably by said body, an indicator connected operatively with said plunger, an indicating scale coacting with said indicator to roughly show the movement of the plunger, additional indicating means connected operatively with said plunger to accurately show its movement, said additional indicating means including a pinion by which it may be set at zero position, means whereby said plunger may be advanced from said body prior to use, means whereby said scale may be restored to zero position after advancement of said plunger, and a rack bar movable bodily with said scale for mesh with said pinion to simultaneously restore said first named indicating means to zero position.

5. A gage of the class described comprising a work engaging plunger, indicating means for showing the movement of said plunger, means for operating said indicating means from said plunger, means for adjusting said indicating means with respect to said plunger, and means whereby either said operating means of said indicating means or said adjusting means for said indicating means may be thrown into operative relation with said indicator.

6. A gage of the class described comprising a work engaging plunger, indicating means for showing the movement of said plunger, means for operating said indicating means from said plunger, means for adjusting said indicating means with respect to said plunger, and a double-acting cam for simultaneously moving said operating means into operative relation with said indicator and said adjusting means into inoperative relation therewith and vice versa.

7. A gage of the class described comprising a work engaging plunger, an indicator for showing the movement of said plunger, said indicator having an operating pinion, a rack bar operated by movement of said plunger to rotate said pinion, means whereby said indicator may be adjusted with respect to said plunger, said adjusting means including a rack bar for coaction with said pinion, and means whereby either rack bar may be thrown into mesh with said pinion.

8. A gage of the class described comprising a work engaging plunger, an indicator for showing the movement of said plunger, said indicator having an operating pinion, a rack bar operated by movement of said plunger to rotate said pinion, means whereby said indicator may be adjusted with respect to said plunger, said adjusting means including a rack bar for coaction with said pinion, and a double-acting cam for simultaneously meshing either rack bar with said pinion and unmeshing the other rack bar therefrom.

9. A gage of the class described comprising a work engaging plunger, an indicator for showing the movement of said plunger, means for operating said indicator from said plunger, and means for disengaging said operating means from said indicator to permit adjustment of said indicator with respect to said plunger.

10. A gage of the class described comprising a work engaging plunger, an indicator for showing the movement of said plunger, means for operating said indicator from said plunger, and a cam for disengaging said operating means from said indicator to permit adjustment of said indicator with respect to said plunger.

11. A gage of the class described comprising a work engaging plunger, an indicator for showing the movement of said plunger, said indicator having an operating pinion, a rack bar mounted on said plunger and meshing with said pinion, and means for throwing said rack bar and pinion out of mesh to permit adjustment of said indicator with respect to said plunger.

12. A gage of the class described comprising a work engaging plunger, an indicator for showing the movement of said plunger, said indicator having an operating pinion, a rack bar mounted on said plunger and meshing with said pinion, and a cam for throwing said rack bar out of mesh with said pinion to permit adjustment of said indicator with respect to said plunger.

13. A gage of the class described comprising a work engaging plunger, an indicator, means for operating said indicator from said plunger, including normally engaged members separable one from the other, and means for adjusting said indicator when said normally engaged members are separated.

14. A gage of the class described comprising a work engaging plunger, an indicator, means for operating said indicator from said plunger, including normally engaged members separable one from the other, normally idle means for adjusting said indicator with respect to said plunger when said normally engaged members are separated, and means for throwing said adjusting means into operative position.

15. A gage of the class described comprising a work engaging plunger, an indicator, means for operating said indicator from said plunger, including normally engaged members separable one from the other, normally idle means for adjusting said indicator with respect to said plunger when said normally engaged members are separated, and a cam for throwing said adjusting means into operative position.

16. A gage of the class described comprising a work engaging plunger and indicating means for showing the movement thereof, said indicating means including a pinion turning of which changes the reading of the indicating means, means for turning said pinion including a movable rack bar, and means for relatively shifting said rack bar and pinion to control operation of the latter.

17. A structure as specified in claim 16, said means for relatively shifting said rack bar and pinion consisting of a movable cam.

18. A gage of the class described comprising a work engaging plunger, an indicator, means for operating said indicator from said plunger, including normally engaged members separable one from the other, and means for adjusting said indicator with respect to said plunger when said normally engaged members are separated, said adjusting means including a slide and a screw for adjusting said slide.

19. A gage of the class described comprising a support, a work engaging plunger carried by said support, an indicator operated by movement of said plunger, a scale coacting with said indicator to show the movement of said plunger, a screw swiveled on said support, and a nut on said scale through which said screw is threaded, whereby to adjust the scale relatively to said indicator.

20. A gage of the class described comprising a support, a work engaging plunger carried by said support, means for advancing said plunger from said support prior to use when required, an indicator operated by movement of said plunger, a scale coacting with said indicator to show the movement of said plunger, and means for longitudinally sliding said scale with respect to said indicator to restore the latter to zero position after advancement of said plunger.

21. A gage of the class described comprising a hollow elongated body, a spring-pressed work engaging plunger slidable in and extending from one end of said body, a dial mounted on said body and an indicating hand coacting with said dial to accurately show the movement of the plunger, said hand having an operating pinion, a rack bar mounted on said plunger for mesh with said pinion, a second indicator movable bodily with said plunger and a scale coacting with said second indicator to roughly show the movement of said plunger, said scale being slidably mounted on said body, means for sliding said scale to adjust it with respect to its indicator, a rack bar mounted on said scale for mesh with said pinion to adjust said hand with respect to said dial, and means for controlling the mesh of the two rack bars with said pinion; together with means for advancing said plunger from said body prior to use.

22. A gage of the class described comprising a support, a work engaging plunger carried by said support and formed of two slidably connected sections, one of which extends from said support, a spring exerting a constant forward stress on said one section of said plunger, means for adjusting the other plunger section longitudinally of the plunger, an indicator operated by said one section of said plunger to show its movement, and means whereby said indicator may be restored to zero position after adjustment of said other section.

23. A gage of the class described comprising a support, a work engaging plunger carried by said support and formed of a male section and a female section sliding one within the other, said male section extending from the body to engage the work, a nut carried by and extending into the rear end of said female section, a screw swiveled on said support and threaded into said nut for adjusting said female section longitudinally of the plunger, a coiled spring within said female section around said nut and bearing against said male section to exert a constant forward stress thereon, an indicator operated by the male section of said plunger for showing its movement, and means for restoring said indicator to zero position after adjustment of said female plunger section.

In testimony whereof I have hereunto set my hand.

CHARLES HALEY.